United States Patent
Jugulum et al.

(10) Patent No.: US 10,248,672 B2
(45) Date of Patent: Apr. 2, 2019

(54) METHODS AND SYSTEMS FOR ASSESSING DATA QUALITY

(75) Inventors: Rajesh Jugulum, Franklin, MA (US); Rajalakshmi Ramachandran, Tampa, FL (US); Jagmeet Singh, Quincy, MA (US); Robert A. Granese, Beverly, MA (US); Kenneth Brzozowski, Monroe Township, NJ (US); Harold Ian Joyce, Charlton, MA (US); Don Gray, Needham, MA (US)

(73) Assignee: CITIGROUP TECHNOLOGY, INC., Weekhawken, NJ (US)

( * ) Notice: Subject to any disclaimer, the term of this patent is extended or adjusted under 35 U.S.C. 154(b) by 1079 days.

(21) Appl. No.: 13/235,703

(22) Filed: Sep. 19, 2011

(65) Prior Publication Data
US 2013/0073594 A1 Mar. 21, 2013

(51) Int. Cl.
G06Q 40/00 (2012.01)
G06F 17/30 (2006.01)

(52) U.S. Cl.
CPC ....... *G06F 17/30303* (2013.01); *G06Q 40/00* (2013.01)

(58) Field of Classification Search
CPC .......................................... G06Q 40/00–40/08
USPC ...................................................... 705/35–37
See application file for complete search history.

(56) References Cited

U.S. PATENT DOCUMENTS

| | | | | |
|---|---|---|---|---|
| 4,344,145 A * | 8/1982 | Chasek | ................. | G01R 13/22 345/24 |
| 5,404,509 A * | 4/1995 | Klein | | |
| 5,715,181 A * | 2/1998 | Horst | ............................ | 702/180 |
| 5,845,285 A * | 12/1998 | Klein | | |
| 8,532,839 B2 * | 9/2013 | Drees | .................... | G05B 15/02 700/108 |
| 2003/0115195 A1 | 6/2003 | Fogel et al. | | |
| 2003/0140023 A1 * | 7/2003 | Ferguson et al. | ................ | 706/21 |
| 2003/0144746 A1 * | 7/2003 | Hsiung et al. | ................... | 700/28 |
| 2003/0149603 A1 * | 8/2003 | Ferguson et al. | ................. | 705/7 |
| 2004/0249602 A1 * | 12/2004 | Gomez et al. | ................ | 702/181 |
| 2005/0182739 A1 * | 8/2005 | Dasu | ...................... | G06Q 10/00 706/47 |
| 2006/0136462 A1 | 6/2006 | Campos et al. | | |

(Continued)

OTHER PUBLICATIONS

International Search Report and Written Opinion dated Dec. 20, 2012 for co-pending PCT Application No. PCT/US12/56055, pp. 1-10.

(Continued)

*Primary Examiner* — Narayanswamy Subramanian
(74) *Attorney, Agent, or Firm* — John M. Harrington, Esq.; Johnson, Marcou & Isaacs, LLC

(57) ABSTRACT

Methods and systems for assessing data involve, collecting samples of data elements from a database storing a population of data elements representing attributes of each numerous different financial transactions. Critical data elements from the collected samples are determined. Data quality rules are built and data dimensions are calculated for the critical data elements. A quality of data within the critical data elements for different data quality dimensions is monitored. Critical data elements that produce a high number of outliers are identified and causes for the outliers are identified. Thereafter, a corrective action plan to address a solution for the causes for the outliers may be developed and executed.

22 Claims, 7 Drawing Sheets

(56) References Cited

U.S. PATENT DOCUMENTS

| | | | |
|---|---|---|---|
| 2006/0173924 A1 | 8/2006 | Wotton et al. | |
| 2007/0198312 A1* | 8/2007 | Bagchi et al. | 705/7 |
| 2008/0195440 A1 | 8/2008 | Bagchi et al. | |
| 2009/0171623 A1 | 7/2009 | Kiefer | |
| 2009/0300052 A1 | 12/2009 | Grichnik et al. | |
| 2010/0287118 A1 | 11/2010 | Lortscher, Jr. | |
| 2010/0318464 A1* | 12/2010 | Mullen | G06Q 20/04 705/44 |
| 2011/0077972 A1* | 3/2011 | Breitenstein | G06Q 10/10 705/3 |
| 2011/0307217 A1* | 12/2011 | Fritz | G01M 15/06 702/183 |
| 2012/0046989 A1* | 2/2012 | Baikalov et al. | 705/7.28 |
| 2012/0137367 A1* | 5/2012 | Dupont et al. | 726/25 |

OTHER PUBLICATIONS

Carlo et al., "A Data Quality Methodology for Heterogeneous Data," International Journal of Database Management Systems, Feb. 2011, vol. 3, No. 1, pp. 60-79.

Evans, "Scaling and Assessment of Data Quality," Acta Cryst., 2006, pp. 72-82.

Yun et al., "The Study of Multidimensional-Data Flow of Fishbone Applied for Data Mining," 2009 Seventh ACIS International Conference on Software Engineering Research, Management and Applications, 2009, pp. 86-91.

* cited by examiner

| | | Critical Data Element | | | | |
|---|---|---|---|---|---|---|
| | Ranking Criteria | 10 | 7 | 7 | 7 | 10 |
| | Proposed CDE/ Criteria | Ease of Access (Easiest =10) | % of Reports (High%=10) | % Customers (High%=10) | Total Incidences (High incidence=10) | Business Support (Strong support = 10) |
| 1 | EXAMPLE | 7 | 7 | 7 | 10 | 10 |
| 2 | GFPID | 10 | 10 | 10 | 10 | 10 |
| 3 | Securitized Flag | 10 | 4 | 10 | 4 | 10 |
| 4 | Type of Acct | 10 | 4 | 4 | 7 | 4 |
| 5 | Fiduciary Balance | 7 | 7 | 4 | 4 | 4 |
| 6 | General Ledger Acct | | | | | |
| 7 | Product Type | | | | | |
| 8 | Collateral type | | | | | |
| 9 | PD/Non- Accrual status | | | | | |
| 10 | Indicator of a Pledge or Guarantee | | | | | |
| 11 | Original Balance | | | | | |
| 12 | Unused Amount | | | | | |
| 13 | Origination date | | | | | |
| 14 | Maturity date | | | | | |
| 15 | Start date | | | | | |
| 16 | Original Maturity date | | | | | |
| 17 | Number of Deposits | | | | | |
| 18 | Number of Loans | | | | | |
| 19 | Number of Fiduciary Accts | | | | | |
| 20 | Number of Transactions | | | | | |
| 21 | Currency type | | | | | |
| 22 | Outstanding Balance | | | | | |
| 23 | Suspended Balance | | | | | |
| 24 | Intercompany Code (ICE) | | | | | |
| 25 | Average Balance | | | | | |
| 26 | Memoranda Balance | | | | | |
| 27 | Legal Entity code | | | | | |
| 28 | GOC code | | | | | |
| 29 | | | | | | |
| 30 | | #VALUE! | #VALUE! | #VALUE! | #VALUE! | #VALUE! |
| Total | | | | | | |

FIG. 1A

Rationalization

| 10 | 10 | 7 | 7 | 4 | |
|---|---|---|---|---|---|
| Technology Support (Strong support=10) | Regulatory Risk (High risk=10) | Financial Risk (High risk=10) | Reputation Risk (High risk=10) | Operations Risk (High risk=10) | Totals |
| 10 | 10 | 10 | 4 | 4 | 652 |
| 10 | 4 | 4 | 4 | 4 | 622 |
| 4 | 10 | 4 | 10 | 4 | 580 |
| 4 | 10 | 4 | 4 | 4 | 457 |
| 4 | 7 | 7 | 7 | 7 | 451 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| | | | | | 0 |
| #VALUE! | #VALUE! | #VALUE! | #VALUE! | #VALUE! | |

*Sort on the totals column from highest to lowest and work on the highest scoring CDE's first*

FIG. 1B

METHODS AND SYSTEMS FOR ASSESSING DATA QUALITY

FIELD OF THE INVENTION

The present invention relates generally to the field of assessing data quality, and more particularly to methods and systems for continuously assessing data quality and initiating corrective action.

BACKGROUND OF THE INVENTION

A database of a business entity, such as a financial institution, keeps track of many different attributes for a given financial transaction. Such attributes for a customer's transaction may include, for example, a parent company and its subsidiary, an amount of the transaction, a date of the transaction, the geographical location of the customer when the transaction occurred, the given time of the year when the transaction occurred, and many other attributes. It has been found that most of such attributes are interrelated, or correlated in mathematical terms.

A current problem faced by such a business entity is that it is very difficult to have all the attributes well defined for all the transactions. For example, some of the attributes will be missing, in which case the business entity must struggle to determine what are the critical attributes that are needed in order to monitor for any given set of transactions or any given set of problems. There is a present need for a way to address and solve this problem.

Further, most databases of business entities, such as financial institutions, currently have either missing, invalid or inaccurate data stored in them. Currently, when the business entity attempts to create data quality rules to assess data quality in its database, the number of data quality rules that are needed may run to many thousands of such rules. There is likewise a present need for a way to enable business entities to assess the data quality for a given database in terms of the validity of the data, the completeness of the data and/or the accuracy of the stored data.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform methods and systems for assessing data quality described herein. Embodiments of the invention involve, for example, collecting, using a microprocessor, samples of data elements from a database storing a population of data elements representing attributes of each of a plurality of different financial transactions. At least some of the attributes of each of the transactions will be interrelated in mathematical terms.

In embodiments of the invention, critical data elements from the collected samples of data elements are determined using the microprocessor. In addition, data quality rules may be built and data dimensions may be calculated for the critical data elements using the microprocessor. A quality of data within the critical data elements for different data quality dimensions is monitored using the microprocessor. Critical data elements that produce a pre-defined high number of outliers may be identified using the microprocessor and causes for the outliers may be identified using the microprocessor. Thereafter, a corrective action plan to address a solution for the identified causes for the outliers may be developed and executed.

According to embodiments of the invention, collecting the samples may involve finding representative samples from the population of data elements using methodologies consisting of at least one of stratified sampling and random sampling. The critical data elements may be determined based at least in part on preliminary analytics comprising one or both of correlation and regression analysis. Determining the critical data elements may involve rationalizing an order of analysis of proposed critical data elements based, for example, on a rationalization matrix for a plurality of proposed critical data elements ranked according to weighted ranking criteria. The critical data elements may be determined based at least in part on executing pattern recognition and attribute dependency algorithms, which may be executed in a pre-defined sequence.

The correlation analysis for embodiments of the invention may be performed to yield a correlation matrix. Additionally, determining the critical data elements based at least in part on preliminary analytics comprising the correlation analysis may involve, for example, defining a relationship between the critical data elements and/or narrowing a number of the critical data elements. Determining the critical data elements based at least in part on preliminary analytics comprising regression analysis may involve, for example, determining what other critical data elements exist based a degree of match between two data elements or increase or decrease in one critical data element with respect to an increase or decrease in another critical data element. Determining the critical data elements may also be based at least on part on subject matter expert input.

In embodiments of the invention, building the data quality rules may involve, for example, building a number of different sets of data quality rules, each set comprising a different number of data quality rules. The data quality rules may be built based at least in part on the calculated data dimensions to determine what types of data quality rules are needed around the calculated data dimensions. An aspect of embodiments of the invention involves, for example, determining a cost for each set of data quality rules as a function of a number of rules in each set, a complexity of the rules in each set, and an interdependency of the rules in each set. Such aspect also involves, for example, determining an overall benefit of each set of data quality rules based on a benefit of having a correct database less a sum of a cost of creating the data quality rules and a cost of poor data quality.

In such aspect, one of the plurality of sets of data quality rules that optimizes the overall benefit may be selected. Such selection may involve, for example, optimizing the overall benefit using non-parametric utility-based methodologies consisting of at least one of a decision tree method and a neural network method. Such selection may involve, for another example, selecting one of the plurality of sets of data quality rules that optimizes the overall benefit using parametric methodologies consisting of at least one of a linear regression method and a correlation method.

In embodiments of the invention, monitoring the quality of the data may involve, for example, monitoring the quality of the data using statistical process control methods. Monitoring the quality of the data may involve, for example, determining whether or not the quality of the data meets pre-determined expectations or is below the pre-determined expectations at a point of use of the data.

Identifying the critical data elements that produce the pre-defined high number of outliers according to embodiments of the invention may be based, for example, on statistical process control methodologies using Pareto distribution for the outliers. Identifying the critical data elements that produce the pre-defined high number of outliers may involve, for example, performing a correlation analysis and generating a scatter plot matrix of the correlation analysis. Further, a degree of correlation between the critical data elements may be identified based on the scatter plot matrix. Identifying a cause for the outliers may involve, for example, performing a root cause analysis to determine which critical data elements cause the outliers. Further, identifying a cause for the outliers may involve, for example, performing advanced analytics using fishbone diagrams to capture the cause for the outliers.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIGS. 1A and 1B show a table which illustrates an example of a critical data element rationalization matrix for embodiments of the invention;

DETAILED DESCRIPTION

Figure 2:
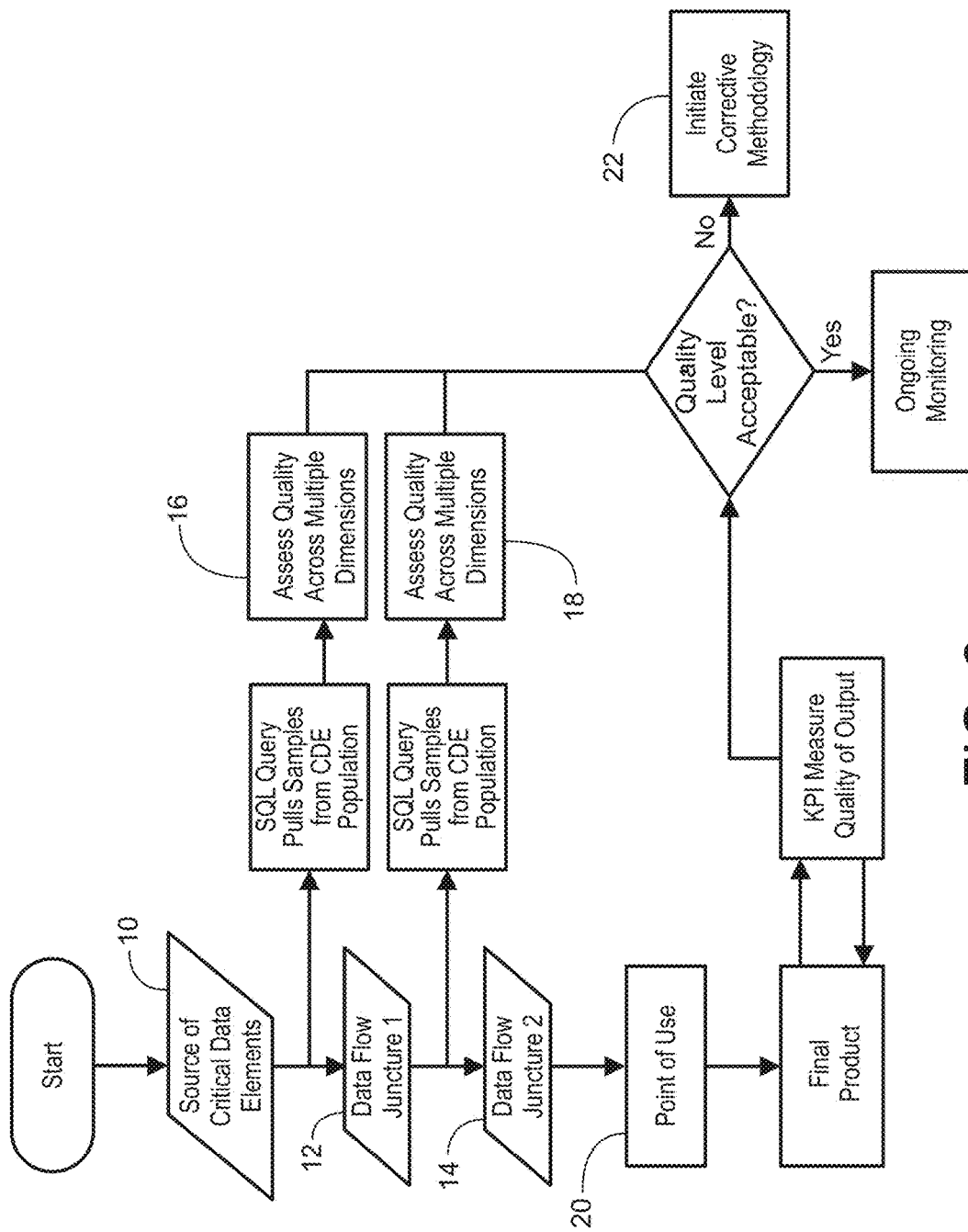
FIG. 2 is a schematic flow chart that illustrates an example of continuous data quality assessment at various transformational points for embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Overview

In embodiments of the invention, critical data elements are first identified and prioritized and thereafter, the critical data elements may be profiled. For example, samples of data may be collected at each of a plurality of data flow junctures. Critical data elements may be determined, according to embodiments of the invention, based on experience, analytics, and profiling of critical data elements. Profiling analysis may lead to an understanding of data patterns of critical data elements and provide insight into missing value information and outliers. In addition, profiling may help to ensure sanctity of data with respect to business specifications and may increase the reliability of data quality analysis for making informed business decisions. Further, profiling may help in building data quality rules, which form the basis of data quality analysis for embodiments of the invention.

An aspect of embodiments of the invention involves, for example, building an optimal set of data quality rules around appropriate data quality dimensions for critical data elements. In such aspect, data quality rules may be used to build data quality dimensions around the critical data elements, and sample data may be used to calculate data quality dimensions. The data quality dimensions may then be used to produce analytical deliverables, such as scorecards and statistical process control charts. The scorecards and statistical process control charts may be further analyzed to identify data related issues based upon which corrective actions may be taken. This is an important aspect of embodiments of the invention in that it facilitates informed business decisions.

A data quality assessment aspect of embodiments of the invention helps judge the comprehensive quality of data based on chosen data quality dimensions. Embodiments of the invention involve, for example, building statistical process control charts for critical data elements. Such statistical process control charts help in the analysis, stability, predictability and capability of critical data elements. In such aspect, Pareto outliers may focus on critical data elements with high number of outliers. The causes of such outliers may be identified using methodologies, such as fishbone diagrams. A corrective action plan may be developed and executed, and improvements may be tracked and monitored.

Funnel Methodology

The continuous data quality assessment and corrective action methodology for embodiments of the invention may be referred to as the funnel methodology. That is at least in part because the methodology begins with a large number of data element samples and narrows that number down to a much smaller number of critical data elements.

In embodiments of the invention, based on the data which an entity, such as a financial institution, already has, a correlation structure may be performed which tells the business entity what the correlation is among various data attributes. This correlation may be found using various statistical methods. Using such correlation structure, subject matter experts in the particular field may be consulted in order to narrow the number of attributes which need to be looked at.

For example, assume three of five elements are correlated. Instead of looking at five elements, it may be necessary to look at only the three elements that are correlated. Specifically, the three elements which should be looked at may be defined by the subject matter expert. Thus, embodiments of the invention offer a solution to the current problem utilizing a mixture of statistical techniques and expert business knowledge.

A critical data element rationalization aspect of embodiments of the invention involves taking critical data elements proposed, for example, by the business and running each of them against various risks and impacts. Such risks and impacts may include, for example, how often a particular critical data element shows up in records, how many customers does it affect, and does it have operational risk, reputational risk, technology risk, or business risk. FIGS. 1A and 1B show a table which illustrates an example of a critical data element rationalization matrix for embodiments of the invention.

The purpose of the critical data element matrix is to rationalize the order of the analysis of the critical data elements proposed by the business. Referring to FIGS. 1A and 1B, the critical data element matrix 102 may include, for example, a row 104 of ranking criteria and a column 106 of proposed critical data elements. Each proposed critical data element in the column 106 of proposed critical data elements may be scored on each one of a weighted set of criteria in the row 104 of ranking criteria, for example, on a numerical scale that ranges from a low of 1 to a high of 10, which are relative scores to the other criteria.

Referring further to FIGS. 1A and 1B, as an example, operations risk 108 may have a numerical rank of 4 near the lower end of the weighted criteria scale, and ease of access 110, business support 112, technology support 114, and regulatory risk 116 may have a numerical rank of 10 at the upper end of the scale. Additionally, percent of reports 118, percent of customers 120, total incidences 122, financial risk 124, and reputation risk 126 may have a numerical rank of 7 near the upper end of the weighted criteria scale.

Referring again to FIGS. 1A and 1B, each of the proposed critical data elements in the column 106 of proposed critical data elements may be numerically ranked in relation to each of the weighted criteria in the row 104 of weighted criteria, likewise on a scale that ranges from a low of 1 to a high of 10. Thereafter, the numerical ranks for each of the proposed critical data elements in the column 106 of proposed critical data elements may be multiplied by the numerical weight of each one of the weighted set of criteria in the row 104 of numerical ranking criteria to yield a score for each proposed critical data element under each weighted criteria.

Referring once more to FIGS. 1A and 1B, the scores for each proposed critical data element under each weighted criteria may be summed, for example, in a totals column 128, and the summed scores may be sorted in the totals column 128 from highest to lowest. The proposed critical data elements associated with the higher summed scores in the totals column 128 may be considered more important in the order of analysis than the proposed critical data element associated with the lower summed scores in the totals column 128.

It is to be noted that while the exemplary critical data element rationalization matrix of FIGS. 1A and 1B includes numerical scores for only five of the proposed critical data elements in the column 106 of proposed critical data elements, embodiments of the invention may include numerical scores for all or any combination of the proposed critical data elements in the column 104 of proposed critical data elements. It is to be further noted that the proposed data elements are not limited to those shown in FIGS. 1A and 1B but may include any other relevant data elements. It is likewise to be noted that the ranking criteria are not limited to those shown in FIGS. 1A and 1B but may include any and all appropriate ranking criteria or any one or more combinations of such ranking criteria.

FIG. 2 is a schematic flow chart that illustrates an example of continuous data quality assessment at various transformational points 12, 14 for embodiments of the invention. The flow chart illustrates an example of the process of assessing the data quality of the number of critical data elements index that were previously deduced. Referring to FIG. 2, once critical data elements have been defined using the methodology referred to herein as the funnel methodology, the data quality of those critical data elements may be assessed using the process illustrated in FIG. 2. Beginning with the critical data elements, the source of the data 10 for those critical data elements is determined. Thereafter, the quality of those critical data elements from the source database is assessed. Next, the flow of critical data elements is tracked through various steps 12, 14 when the data assessment was performed, such as when the data compilation occurred. Thus, the data quality is assessed at every step 12, 14 through which the data goes.

An objective is to determine whether or not the quality of the data meets pre-determined expectations or is below the pre-determined expectations at the point of use 20 of the data. If the quality of the data is below the pre-determined expectations, an improvement methodology 22 may be implemented for the data quality. Such improvement methodology 22 may involve, for example, implementing appropriate steps in the process to assure that proper data is flowing through the process for the critical data elements that have been defined.

Figure 3:
FIG. 3 is a table that illustrates an example of a correlation matrix for a correlation analysis of data elements for embodiments of the invention.

FIG. 3 is a table that illustrates an example of a correlation matrix 24 for a correlation analysis of data elements for embodiments of the invention. The funnel methodology involves at all the data in a database across various dimensions. Assume, for example, that 100 data elements are being looked at. Based on either or both of predefined parameters and the experience of subject matter experts, a determination can be made that out of those 100 data elements only a certain lesser number of those data elements, such as only 50 data elements, are important.

A correlation analysis may be performed among those 50 data elements. Referring to the correlation matrix 24 of FIG. 3, certain of the data elements, such as X4 and X7, X12 and X30, and X29 and X30 are highly correlated and other of the data elements, such as X4 and X15, X7 and X15, and X12 and X29 are moderately correlated. For example, using a weather analogy, it is generally true that temperature and humidity at any given geographical location are correlated most of the time. If that correlation happens to be 90 percent, temperature can be declared by humidity or humidity by temperature, based on a particular problem under consideration. That example is analogous to what is shown by the degrees of correlation in the correlation matrix 24 of FIG. 3. Thus, the critical data elements that are being looked at can be narrowed down into a further smaller set. Using the correlation, the number of data elements can be scaled down, for example, from 50 critical data elements to 25 critical data elements on which to focus.

Further, employing a statistical process control chart and outlier analysis, the number of critical data elements may be further reduced, for example, from 25 to five or 10 critical data elements. Referring further to the flow chart of FIG. 2, at each data flow juncture 12, 14, samples are collected 16, 18. The process begins 10 with a given number of data elements for which data is needed. A database may have, for example, tens of millions or hundreds of millions of records of such data elements. It is obviously not practical to run correlation studies on all those records.

Therefore, sample collection involves finding a representative sample in the population for those critical data elements among all of the stored data elements. Sample collection can be done using various different methodologies, such as stratified sampling, random sampling, or any other known strategy to create a representative sample from a population. Stratified sampling may involve selecting independent samples from a number of subpopulations, groups or strata within the population. Random sampling may involve selecting simple random samples so that all samples of the same size have an equal chance of being selected from the population.

Thereafter, the critical data elements may be determined in the manner previously discussed herein. The determination of such critical data elements may involve, for example, positive experience of subject matter experts and preliminary analytics. Use of the positive experience of subject matter experts is not merely a matter of subjective judgment. From long experience in the particular area, such subject matter experts know precisely what is critical and what is not critical for a given problem under study.

The determination of critical data elements for embodiments of the invention may employ a mixture of the experience of subject matter experts and established parameters on which such determination scan be made. Thus, embodiments of the invention may employ a structured methodology to determine which data elements can be quantified as the critical data elements based on the weight given to each and every data element for a given transaction.

For example, assume that a transaction occurs and various data elements on that transaction are recorded. The structured methodology for embodiments of the invention tells a user that the amount of the particular transaction is a critical data element and that the time of that transaction is a critical data element. The remaining data elements that are captured for the transaction may be useful simply to perform sanity checks around those critical data elements.

An example of preliminary analytics for embodiments of the invention is a correlation analysis that is performed on the data itself. Such a correlation analysis for embodiments of the invention is illustrated in the correlation matrix 24 that is illustrated in FIG. 3. The correlation analysis defines the relationship between the data elements and allows the number of those data elements to be narrowed to a few critical data elements.

Another example of preliminary analytics for embodiments of the invention is regression analysis. Regression analysis is another kind of correlation analysis that can be used to determine what other critical data elements exist, based on how more than two data elements match with each other or increase or decrease with each other.

Other aspects of embodiments of the invention may involve, for example, building data quality rules and calculating data quality dimensions for critical data elements. The dimensions may already be known for those critical data elements which have been previously defined as needing to be looked at. Building the data quality rules may involve looking at the particular dimensions for the critical data elements to determine what sort of data quality rules are needed around those dimensions.

Building data quality rules for embodiments of the invention may involve, for example, determining whether or not certain fields should be complete, whether or not the data in those fields should be valid, and/or whether or not the data in those fields should be accurate. Thus, different kinds of rules may be built around those dimensions for the data in the critical data elements.

Once the rules are built, another aspect of embodiments of the invention is to monitor the quality of the data within the critical data elements for different data quality dimensions. Such monitoring may be performed using statistical process control to determine or to monitor the quality of the data. Statistical process control (SPC) is the application of statistical methods to the monitoring and control of a process to ensure that it operates at its full potential to produce conforming results.

An additional aspect of embodiments of the invention to increase the focus on critical data elements may involve using statistical process control, such as Pareto distribution, to determine outliers. Pareto analysis is a statistical technique in decision-making that may be used for selection of a limited number of elements that produce significant overall effect. Thus, it is possible to look at which critical data elements may be producing outliers on a statistical process control chart. Having such outliers may be an indication that a process is out of control.

In embodiments of the invention, once it is determined which critical data elements are out of control, a root cause analysis may be performed to determine which one or more of the critical data elements is the cause of the outliers. Root cause analysis (RCA) is a class of problem solving methods aimed at identifying the root causes of problems or events. In one aspect, a "brain storming" session may be held in addition to the root cause analysis to find the exact cause of the outliers. Fishbone diagrams may be made and advanced analytics performed to capture the correct cause for the outliers. Fishbone diagrams are causal diagrams that show the causes of a certain event.

Figure 4:
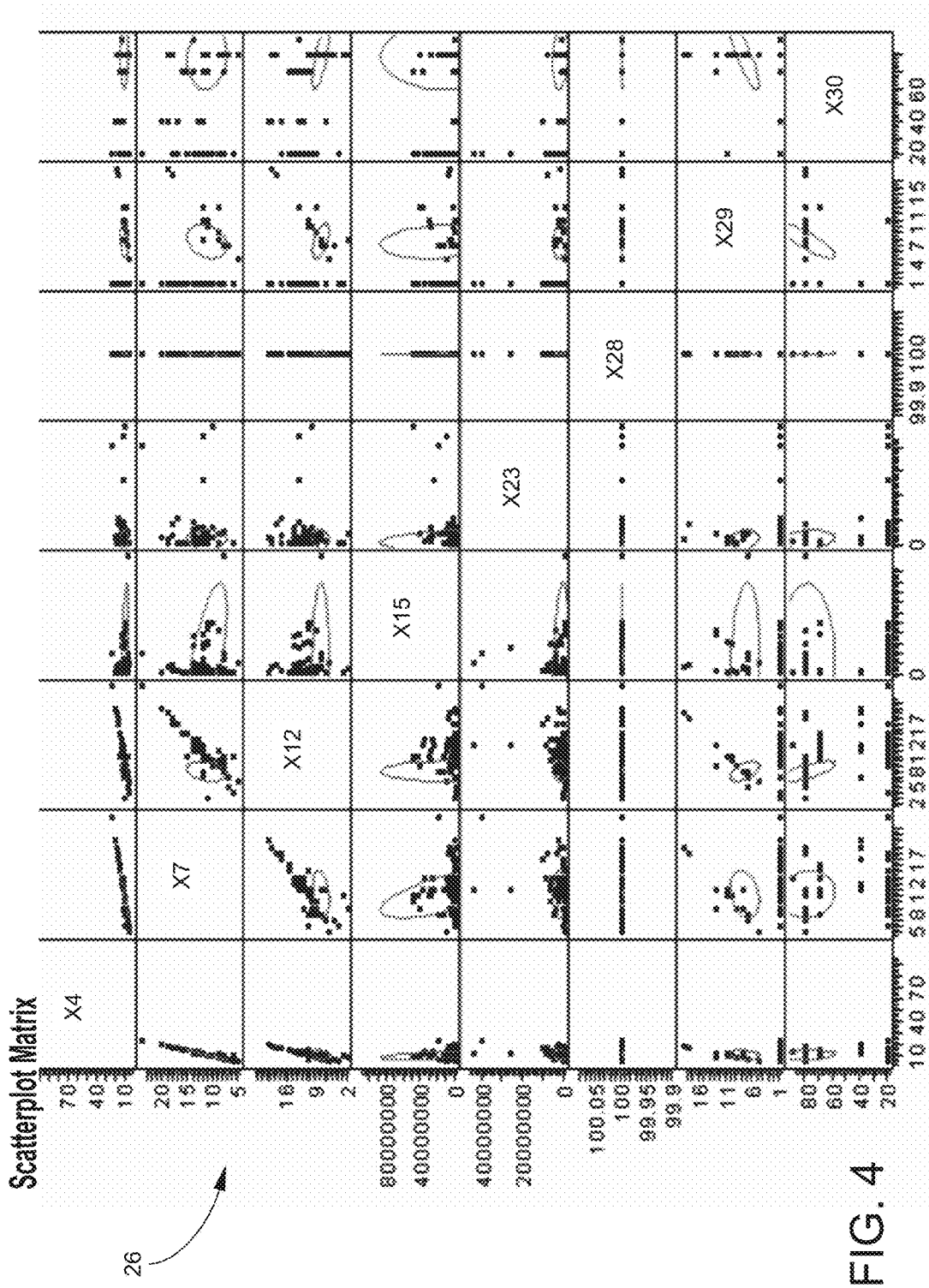
FIG. 4 is an example of a scatter plot matrix version of the correlation analysis illustrated in FIG. 3.

According to embodiments of the invention, once the cause of an outlier is determined, a solution to that particular cause may be addressed by developing and executing a corrective action plan. FIG. 4 is an example of a scatter plot matrix 26 version of the correlation analysis 24 illustrated in FIG. 3. Instead of showing a singular number for each cell as illustrated on the correlation analysis 24, the scatter plot matrix 26 actually plots each and every data element across a corresponding data element within the critical data element matrix that has been defined.

Referring to the scatter matrix plot 26 of FIG. 4, a straight or nearly straight-line relationship, such as between X4 and X7, indicates a high degree of correlation because the relationship is linear. Thus, X4 and X7 are highly correlated because the relationship is linear. Referring to the correlation analysis illustrated in FIG. 3, it can be seen that the correlation is over 0.9984 for those two data elements.

Figure 5:
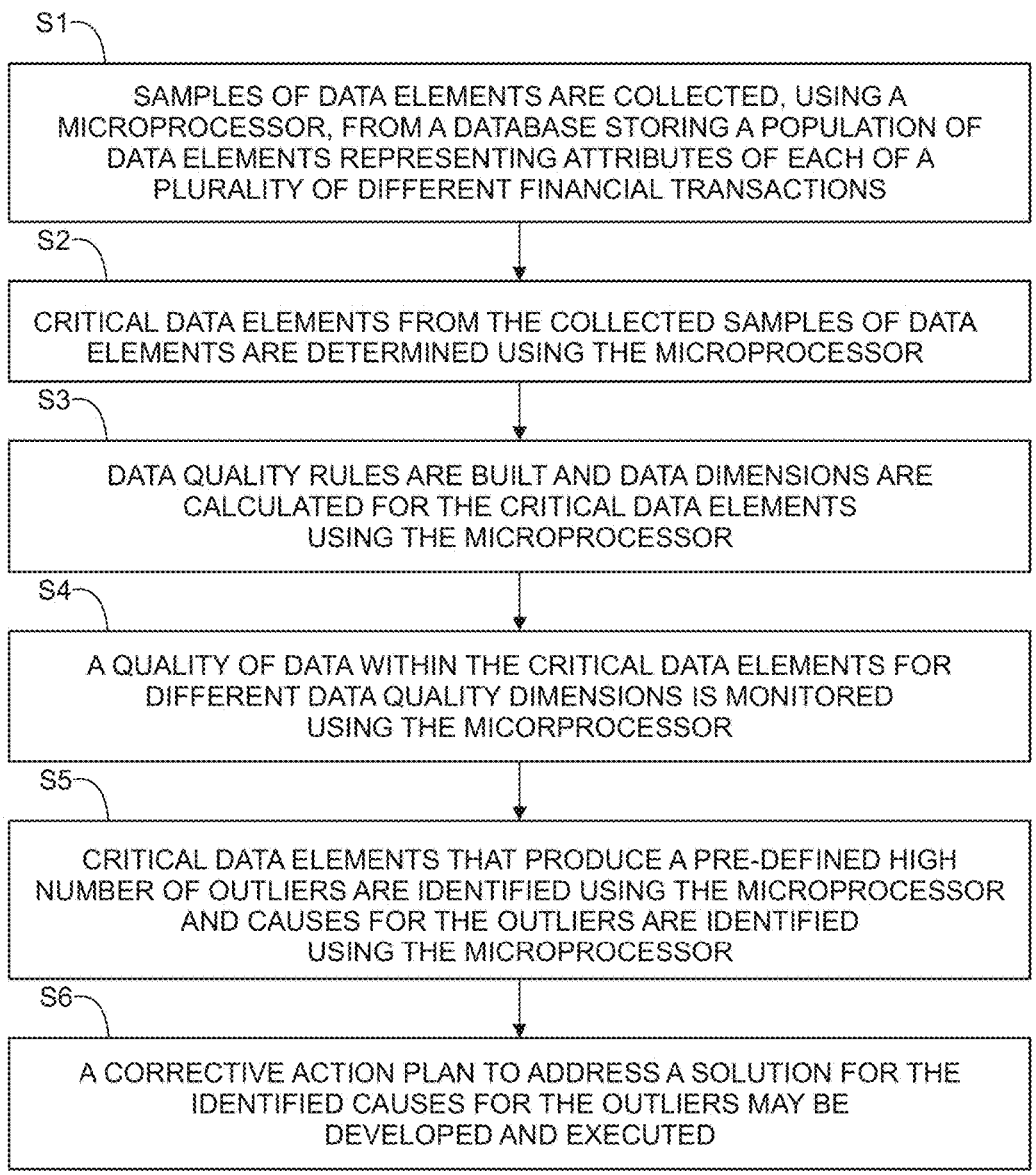
FIG. 5 is a flow chart that illustrates an example of the process of data quality assessment for embodiments of the invention.

FIG. 5 is a flow chart that illustrates an example of the process of data quality analysis for embodiments of the invention. Referring to FIG. 5, at S1, samples of data elements are collected, using a microprocessor, from a database storing a population of data elements representing attributes of each of a plurality of different financial transactions. At S2, critical data elements from the collected samples of data elements are determined using the microprocessor.

Referring further to FIG. 5, at S3, data quality rules are built and data dimensions are calculated for the critical data elements using the microprocessor. At S4, a quality of data within the critical data elements for different data quality dimensions is monitored using the microprocessor. At S5, critical data elements that produce a pre-defined high number of outliers are identified using the microprocessor and causes for the outliers are identified using the microprocessor. At S6, a corrective action plan to address a solution for the identified causes for the outliers may be developed and executed.

Another aspect for embodiments of the invention may involve preparation of scorecards with descriptive statistics for important critical data elements. Once the statistical process control charts and correlation analyses have been developed and once it has been determined which of the critical data elements are giving outliers on the statistical process control charts, the number of outliers can be captured and presented, for example, as a scorecard of the particular critical data element.

For example, the scorecard may identify and show a particular critical data element that is giving 20 percent of the outliers within a given database that has been sampled. Thus, the scorecard is a simplified way of communicating results with the details of the analyses. The scorecard simply shows what critical data elements were defined and, based on the statistical process control charts, what percentage of the population within a particular data element is an outlier.

Various aspects of the process of data quality analysis for embodiments of the invention are performed using one or more algorithms. For example, the way in which the samples are constructed may be based on various different statistical parameters, such as random sampling and/or stratified sampling or any other sampling methodology. Various aspects of the process for embodiments of the invention are also performed using computer hardware and software. Performing the correlation analysis and the regression analysis also involves utilization of various different kinds of statistical algorithms. Various statistical software and hardware are also used to perform the correlation and regression analysis.

Data Quality Rules

Embodiments of the invention enable business entities to assess the data quality for a given database in terms of the validity of the data, the completeness of the data and/or the accuracy of the stored data. As previously noted herein, when a business entity attempts to create data quality rules to assess the quality of data in its database, the number of data quality rules that are needed may run to many thousands. An examination of such rules may reveal that a number of the data quality rules coincide with one another and thus overlap each other.

Overlapping data quality rules may find similar errors in various data attributes that are being looked at. For an example of a data quality rule, assume a table which gives various attributes for a customer, such as the name of the customer, the age of the customer, the date on which the customer became a customer, and whether the customer's account is active or inactive.

Looking at a column in such table for an attribute, such as the customer's age, if the age of the customer is determined to be less than 10 years or greater than 110 years, an alarm should be generated for anyone dealing with the particular customer. It should be self-apparent that a child who is 10 years of age is unable to enter a transaction and that a person who is 110 years of age is unlikely to be able to perform a transaction. Thus, a determination that a customer is less than 10 years old or over 110 years old is an indication that something must be missing or that the particular data field is incorrect. Therefore, an entity that deals with millions of records of various different customers may set a data quality rule to say that the age of a customer should be between 10 years and 110 years.

An attribute, such as a customer's age is an attribute that can be determined by a business entity, such as a bank. If the age of a customer falls outside the range of such as data quality rule, an alarm can be triggered to indicate that something may be wrong about the particular customer or because some of the data elements may be missing. Reasons for falling outside the particular age range of such data quality rule may include, for example, that the customer's age was entered inaccurately at the beginning of the customer relationship or it that the customer may have died and someone else may be attempting to use the customer's name to perform transactions.

It can be seen that even with a customer's age, the number of data quality rules may be numerous. For example, various countries may have various different legal age limits to enter business transactions. Thus, there may be slightly different data quality rules on a given set of dimensions for each country. Embodiments of the invention involve building many data quality rules at the same time for a given database to assure that the data which is being dealt with is accurate and the most appropriate.

As can be seen, there can be many different sets of data quality rules for a particular database. For example, one set of data quality rules may have 1,000 rules, a second set may have 50 rules, and a third set may have 10 rules. All of such rules are intended to provide the most appropriate and accurate data. However, for each set of data quality rules, there is an associated cost. One such cost, for example, is a cost of having inaccurate data and/or invalid data in the database. Another such cost is an infrastructure cost associated with each set of data quality rules. The greater the number of data quality rules, the greater the number of runs needed on the database, and hence the more computational time needed. On the other hand, a benefit of each set of data quality rules is the value of having correct attributes in the database.

In embodiments of the invention, the cost of each set of data quality rules may be determined. The cost of a given set of data quality rules is a function of the number of rules in the set, the complexity of the rules in the set, and the interdependency of the rules in the set. Thereafter, the overall benefit of each set of data quality rules may be determined. The overall benefit of a set of data quality rules is based, for example, on the benefit of having the correct database less a sum of the cost of creating the data quality rules plus the cost of poor data quality.

According to embodiments of the invention, an optimization can then be run for each and every given data quality rule set to find a set of data quality rules which maximizes the overall benefit. Techniques for maximizing the overall benefit may involve parametric or non-parametric techniques. One such non-parametric technique to maximize the overall benefit may be a non-parametric utility-based approach. Non-parametric utility-based methodologies include, for example, decision trees and neural networks. On the other hand, parametric techniques to maximize the overall benefit may include statistical methods, such as linear regression and correlations.

In embodiments of the invention, an objective of the non-parametric technique is to estimate an actual value for the parameter threshold function. Using non-parametric methods, no parameters are defined but a relationship is established between values and, for example, a neural network method or decision tree may be utilized. Thus, actual values are not important using non-parametric methods. Instead, the objective is to determine the extent of a relationship between values.

As noted above, each set of data quality rules has an associated cost that is a function of the number of rules, the complexity of the rules, and the interdependencies of the rules. A value for the number of rules is self-apparent. A value for the complexity of the rules is defined by a number of computations that may be required on each and every data element based on the rules. For example, looking only at a customer's age and looking at a range of ages between 10 years and 110 years represents one computation which must be performed on a single element of the data.

However, the data quality element can be complex, such as looking at the age of the customer, together with the geographical location of the customer, the time of the transaction, and the year in which the transaction occurred. Looking at those various dimensions with one data quality rule, the number of computations performed for each single element has increased fourfold from one computation for age, to four computations for age, geographical location, time of the transaction, and year of the transaction. The computation under one rule is four times as complex as it is under the other rule.

In embodiments of the invention, a direct approach to defining interdependencies of rules is to perform a correlation analysis. In some cases the interdependencies are so complex that the interdependencies cannot be defined in simple terms. In such cases, the cost of such interdependencies is considered. For example, when a data quality rule is run, the number of problems solved for that database may be determined. Assume, for example, running a set of 10 rules on a particular database with which 100 problems are rectified. Assume also running a different set of five rules on the same database with which the same 100 problems are rectified. In such example, it may be logically concluded that the set of 10 rules has a number of complicated interdependencies which can be avoided using the set of five rules.

Figure 6:
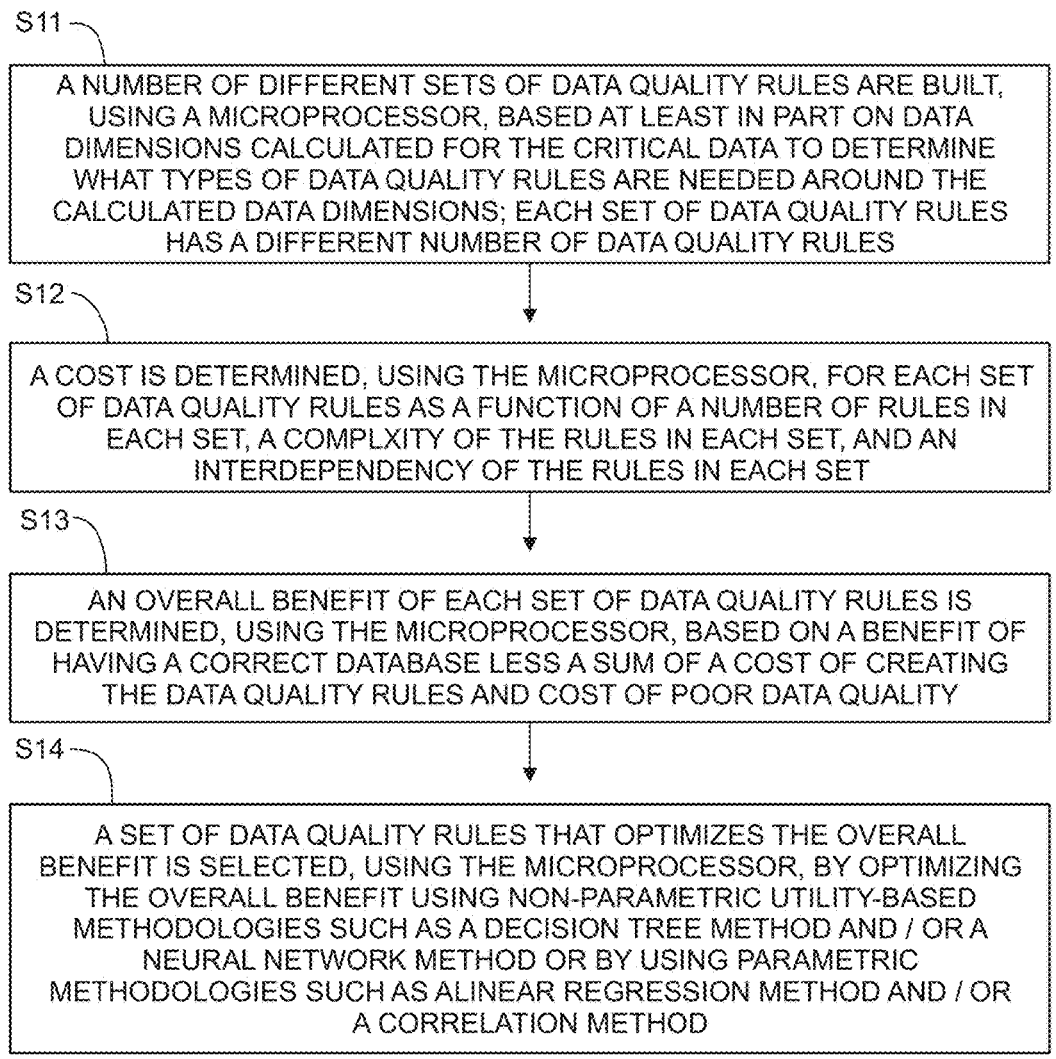
FIG. 6 is a flow chart that illustrates an example of the process of building data quality rules for embodiments of the invention.

FIG. 6 is a flow chart that illustrates an example of the process of building data quality rules for embodiments of the invention. Referring to FIG. 6, at S11, a number of different sets of data quality rules are built, using a microprocessor, based at least in part on data dimensions calculated for the critical data to determine what types of data quality rules are needed around the calculated data dimensions. Each set of data quality rules may have a different number of data quality rules. At S12, a cost may be determined, using the microprocessor, for each set of data quality rules as a function of a number of rules in each set, a complexity of the rules in each set, and an interdependency of the rules in each set.

Referring further to FIG. 6, at S13, an overall benefit of each set of data quality rules may be determined, using the microprocessor, based on a benefit of having a correct database less a sum of a cost of creating the data quality rules and a cost of poor data quality. At S14, a set of data quality rules that optimizes the overall benefit may be selected, using the microprocessor, by optimizing the overall benefit using non-parametric utility-based methodologies such as a decision tree method and/or a neural network method or by using parametric methodologies such as a linear regression method and/or a correlation method. Assume, assume, for example, four sets of data quality rules. In embodiments of the invention, the set of data quality rules that optimizes or maximizes the overall benefit is selected from the four sets of rules.

Referring again to FIG. 6, the overall benefit of a set of data quality rules equals the benefit of a correct database less the sum of the cost of the data quality rules and the cost of poor data quality. Assume for example, a marketing database. If the mistakes in the data itself are corrected, a more targeted approach on the marketing may be afforded. In that sense, if 20 applications for a product are received by a marketing department in response to a mailing with an incorrect database and 100 applications for the product are received by the marketing department in response to the mailing with the correct database, the response level with the correct database has increased by a multiple of five.

Sending marketing material to a customer at an incorrect address is an example of the cost of poor data quality. Assume in the marketing database example, that the database has incorrect entries. The most common incorrect marketing database entry is a customer's address. Thus, if marketing material is sent to a customer whose address is incorrect in the database, that customer will not receive the material and could not respond to the marketing material.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:
1. A method, comprising:
selecting, by a microprocessor, a group of proposed critical data elements from a plurality of proposed critical data elements consisting at least in part of type of account, original balance, origination date, number of deposits, and number of loans based at least in part on ranking each of the plurality of proposed critical data elements according to weighted criteria consisting at least in part of ease of access to each proposed critical data element, regulatory risk associated with each proposed critical data element, financial risk asso- ciated with each proposed critical data element, and reputation risk associated with each proposed critical data element;

collecting, by the microprocessor, samples of data for each of the proposed critical data elements in said group of proposed critical data elements from a database storing a population of data elements representing attributes of each of a plurality of different financial transactions;

identifying, by the microprocessor, a portion of said group of proposed critical data elements based at least in part on a ranking of respective degrees of correlation between said data samples for each of the proposed critical data elements in said group of proposed critical data elements;

generating, by the microprocessor, a plurality of different, overlapping sets of data quality rules at least in part in terms of data completeness and data validity for each of the proposed critical data elements in said portion of said group of proposed critical data elements, each set of data quality rules comprising a different number of data quality rules for the same proposed critical data elements in said portion of said group of proposed critical data elements;

identifying, by the microprocessor, one of the plurality of different, overlapping sets of data quality rules for monitoring a quality of data in said database based at least in part on a difference between a value for each of said sets of data quality rules as a function of accuracy or completeness of data in the database and a sum of a cost of creating each set of data quality rules as a function of number, complexity, and interdependency of rules in each of said sets of data quality rules;

monitoring, by the microprocessor, the quality of data within said database using said identified one of the plurality of different, overlapping sets of data quality rules identifying, by the microprocessor, critical data elements that produce a pre-defined high number of outliers in said data within said database based on said monitoring the quality of data in said database indicative of a likelihood that a process is out of control; and identifying, by the microprocessor, causes for the pre-defined high number of outliers produced by said critical data elements in said data within said database.

2. The method of claim 1, wherein collecting the samples further comprises collecting the samples of data for each of the proposed critical data elements in said group of proposed critical data elements from the database storing the population of data elements representing attributes of each of the plurality of different financial transactions, each of said transactions having at least some attributes that are correlated with one another.

3. The method of claim 1, wherein collecting the samples further comprises finding representative samples from said population of data elements using methodologies consisting of at least one of stratified sampling and random sampling.

4. The method of claim 1, further comprising rationalizing an order of analysis of said proposed critical data elements.

5. The method of claim 4, wherein rationalizing the order of analysis further comprises rationalizing the order of analysis of said proposed critical data elements based on a rationalization matrix.

6. The method of claim 5, wherein rationalizing the order of analysis based on the rationalization matrix further comprises rationalizing the order of analysis of said proposed critical data elements based on a rationalization matrix for the plurality of proposed critical data elements ranked according to weighted ranking criteria.

7. The method of claim 1, wherein identifying said portion of said group of proposed critical data elements based at least in part on said ranking of respective degrees of correlation between said data samples for each of the proposed critical data elements in said group of proposed critical data elements further comprises determining a degree of correlation between increases or decreases in values of said data samples for each of the proposed critical data elements in said group of proposed critical data elements with respect to increases or decreases in a values of other of said data samples for each of the proposed critical data elements in said group of proposed critical data elements.

8. The method of claim 7, wherein determining said degree of correlation between increases or decreases in values of said data samples for each of the proposed critical data elements further comprises performing a correlation analysis to yield a correlation matrix.

9. The method of claim 7, wherein identifying said portion of said group of proposed critical data elements based at least in part on said ranking of respective degrees of correlation between said data samples for each of the proposed critical data elements in said group of proposed critical data elements further comprises defining a relationship between the proposed critical data elements in said group of proposed critical data elements.

10. The method of claim 9, wherein identifying said portion of said group of proposed critical data elements based at least in part on said ranking of respective degrees of correlation between said data samples for each of the proposed critical data elements in said group of proposed critical data elements further comprises reducing a number of the proposed critical data elements in said group of proposed critical data elements to a number of proposed critical data elements in said portion of said group of proposed critical data elements based at least in part on said ranking of respective degrees of correlation between said data samples for each of the proposed critical data elements in said group of proposed critical data elements.

11. The method of claim 1, wherein identifying said critical data elements that produce the pre-defined high number of outliers further comprises identifying the critical data elements that produce the pre-defined high number of outliers based at least in part on executing pattern recognition and attribute dependency algorithms.

12. The method of claim 11, wherein identifying said critical data elements that produce the pre-defined high number of outliers further comprises identifying the critical data elements that produce the pre-defined high number of outliers based at least in part on executing the pattern recognition and attribute dependency algorithms executing in a pre-defined sequence.

13. The method of claim 1, wherein identifying said critical data elements that produce the pre-defined high number of outliers further comprises determining the critical data elements based at least on part on subject matter expert input.

14. The method of claim 1, wherein identifying said one of the plurality of different, overlapping sets of data quality rules further comprises optimizing an overall benefit based on using non-parametric utility-based methodologies consisting of at least one of a decision tree method and a neural network method.

15. The method of claim 1, wherein identifying said one of the plurality of different, overlapping sets of data quality rules further comprises identifying one of the plurality of sets of data quality rules that optimizes the overall benefit using parametric methodologies consisting of at least one of a linear regression method and a correlation method.

16. The method of claim 1, wherein identifying said critical data elements that produce the pre-defined high number of outliers further comprises identifying the critical data elements that produce the pre-defined high number of outliers based on statistical process control methodologies using Pareto distribution for the outliers.

17. The method of claim 1, wherein identifying said critical data elements that produce the pre-defined high number of outliers further comprises performing a correlation analysis and generating a scatter plot matrix of the correlation analysis.

18. The method of claim 17, wherein performing said correlation analysis and generating the scatter plot matrix further comprises identifying a degree of correlation between the critical data elements based on the scatter plot matrix.

19. The method of claim 1, wherein identifying said causes for the outliers further comprises performing a root cause analysis to identify at least one critical data that caused the outliers.

20. The method of claim 1, wherein identifying said causes for the outliers further comprises performing advanced analytics using fishbone diagrams to capture at least one cause for the outliers.

21. A system, comprising:
a microprocessor programmed to:
select a group of proposed critical data elements from a plurality of proposed critical data elements consisting at least in part of type of account, original balance, origination date, number of deposits, and number of loans based at least in part on ranking each of the plurality of proposed critical data elements according to weighted criteria consisting at least in part of ease of access to each proposed critical data element, regulatory risk associated with each proposed critical data element, financial risk associated with each proposed critical data element, and reputation risk associated with each proposed critical data element;
collect samples of data for each of the proposed critical data elements in said group of proposed critical data elements from a database storing a population of data elements representing attributes of each of a plurality of different financial transactions;
identify a portion of said group of proposed critical data elements based at least in part on a ranking of respective degrees of correlation between said data samples for each of the proposed critical data elements in said group of proposed critical data elements;
generate a plurality of different, overlapping sets of data quality rules at least in part in terms of data completeness and data validity for each of the proposed critical data elements in said portion of said group of proposed critical data elements, each set of data quality rules comprising a different number of data quality rules for the same proposed critical data elements in said portion of said group of proposed critical data elements;
identify one of the plurality of different, overlapping sets of data quality rules for monitoring a quality of data in said database based at least in part on a difference between a value for each of said sets of data quality rules as a function of accuracy or completeness of data in the database and a sum of a cost of creating each set of data quality rules as a function of number, complexity, and interdependency of rules in each of said sets of data quality rules
monitor the quality of data within said database using said identified one of the plurality of different, overlapping sets of data quality rules
identifying critical data elements that produce a pre-defined high number of outliers in said data within said database based on said monitoring the quality of data in said database indicative of a likelihood that a process is out of control; and
identifying causes for the pre-defined high number of outliers produced by said critical data elements in said data within said database.

22. A non-transitory computer-readable storage medium with an executable program for assessing data quality stored thereon, wherein the program instructs a microprocessor to perform the steps of:
selecting a group of proposed critical data elements from a plurality of proposed critical data elements consisting at least in part of type of account, original balance, origination date, number of deposits, and number of loans based at least in part on ranking each of the plurality of proposed critical data elements according to weighted criteria consisting at least in part of ease of access to each proposed critical data element, regulatory risk associated with each proposed critical data element, financial risk associated with each proposed critical data element, and reputation risk associated with each proposed critical data element;
collecting samples of data for each of the proposed critical data elements in said group of proposed critical data elements from a database storing a population of data elements representing attributes of each of a plurality of different financial transactions;
identifying a portion of said group of proposed critical data elements based at least in part on a ranking of respective degrees of correlation between said data samples for each of the proposed critical data elements in said group of proposed critical data elements;
generating a plurality of different, overlapping sets of data quality rules at least in part in terms of data completeness and data validity for each of the proposed critical data elements in said portion of said group of proposed critical data elements, each set of data quality rules comprising a different number of data quality rules for the same proposed critical data elements in said portion of said group of proposed critical data elements;
identifying one of the plurality of different, overlapping sets of data quality rules for monitoring a quality of data in said database based at least in part on a difference between a value for each of said sets of data quality rules as a function of accuracy or completeness of data in the database and a sum of a cost of creating each set of data quality rules as a function of number, complexity, and interdependency of rules in each of said sets of data quality rules;
monitoring the quality of data within said database using said identified one of the plurality of different, overlapping sets of data quality rules
identifying critical data elements that produce a pre-defined high number of outliers in said data within said database based on said monitoring the quality of data in said database indicative of a likelihood that a process is out of control; and identifying causes for the pre-defined high number of outliers produced by said critical data elements in said data within said database.

* * * * *